INVENTOR.
MELVIN M. SEELOFF
ATTORNEY

United States Patent Office 3,484,579
Patented Dec. 16, 1969

3,484,579
STRIP WELDER WITH GAUGING AND TRIMMING MEANS
Melvin M. Seeloff, Warren, Ohio, assignor to The Taylor-Winfield Corporation, Warren, Ohio, a corporation of Ohio
Filed Sept. 3, 1965, Ser. No. 484,875
Int. Cl. B23k 9/00, 11/04, 9/02
U.S. Cl. 219—97    7 Claims

ABSTRACT OF THE DISCLOSURE

Unitary mounting for supporting the gauge bar and trimming tools of a flash welder on opposite sides of the strip to be flash welded. Transverse guided movement of a single carrier by a single piston will move both the bar and trimming tools simultaneously. Die cleaning portions are provided on the upper and lower edge portions of the gauging bar to scrape the interfaces of the platens of the strip clamps. The single mounting and operating mechanism for the tools, gauge bar and die cleaners thus considerably simplifies the assembly.

---

Figure 1:
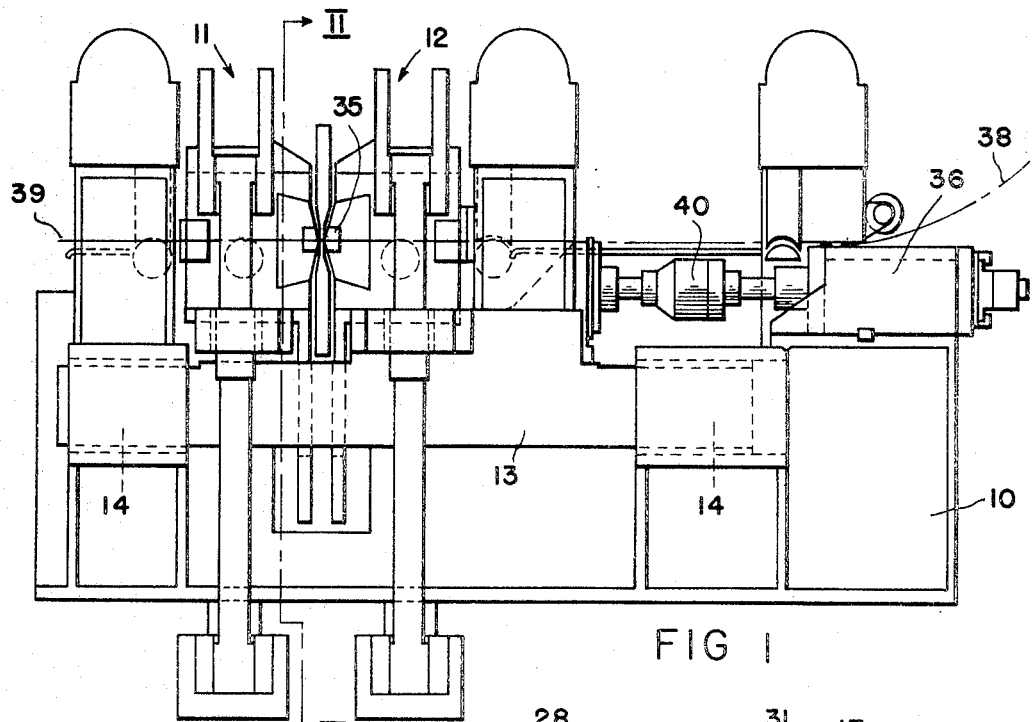

This invention relates to improved combined apparatus for flash-butt welding metal strip lengths in general end-to-end relation and for trimming the flash or upset from opposite surfaces of the welded strip. Such apparatus is generally known but the present invention seeks to provide a highly simplified and more rugged arrangement for performing the necessary operations on the strip which may be taken as (a) the proper loading of the strip lengths in the welder, (b) the flash-butt welding together of the strip lengths, and (c) the trimming off of the flash or upset. To avoid complexity in the apparatus, it has heretofore been proposed to trim off the flash or upset by tools or cutters which are accurately guided across the strip after the joining thereof but while the strip lengths are still secured by the main work clamps of the welder. It has also been heretofore proposed to provide a gauge bar of accurate thickness which is moved in between the welder clamps preparatory to making a weld and against which the tail end of a preceding strip length and the head end of a new strip length may be abutted to properly position and space the strip lengths in the welder before the weld clamps are closed.

It is the primary object of the present invention to provide a simplified and unitary assembly for mounting and operating both the trimming tools and the gauge bar whereby the complexity of the apparatus as well as its mode of operation are materially simplified. This is brought about, in accordance with the principles of the invention by providing an accurately guided sliding carrier which is movable transversely of the longitudinal axis of the strip on the centerline of the weld and which carries in transversely spaced relation a trimming device and a gauge bar sufficiently spaced transversely to permit the running of strip therebetween during the periods between the joining cycles. By providing the carrier with sufficient stroke the gauge bar may be properly positioned for interception of the strip ends when the carrier is in one position but which nevertheless permits the cutting device to have full transverse sweep across the strip during subsequent movement of the carrier. This arrangement simplifies the apparatus and controls and permits of greater ruggedness and less maintenance.

The manner in which the above object is accomplished in a most practical way will be better understood from a consideration of the following specification and the accompanying drawing wherein there is disclosed a preferred embodiment of the invention.

Figure 2:
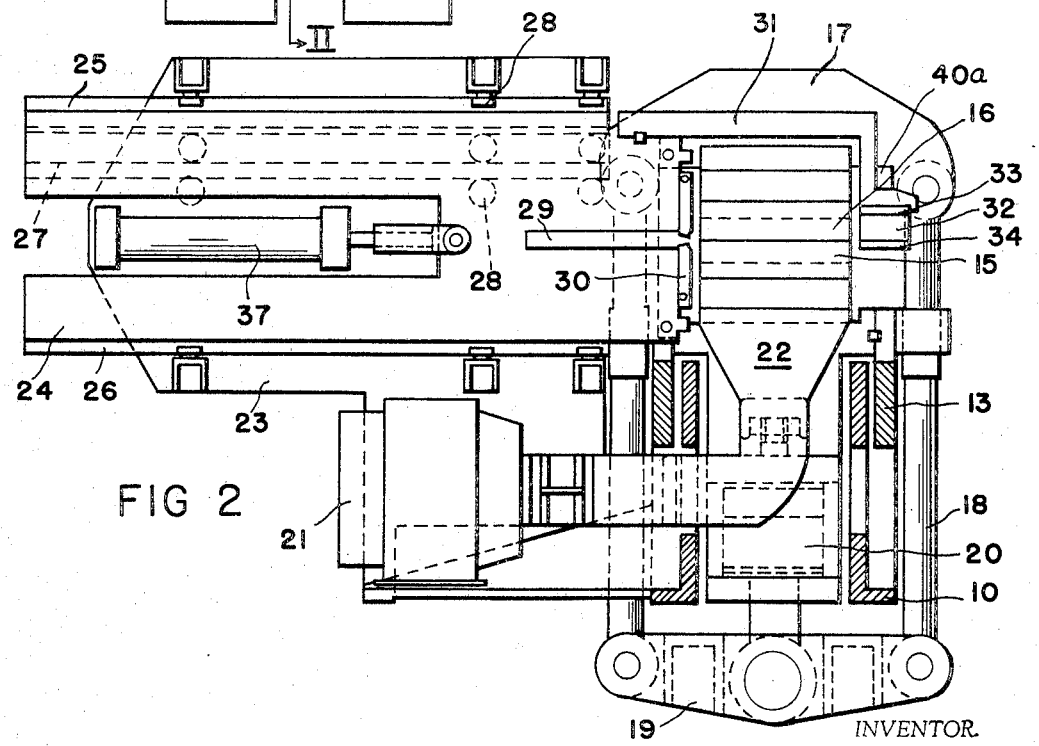

In the drawing:

FIGURE 1 is a side elevation of a strip welder constructed in accordance with the principles of the invention; and FIGURE 2 is a transverse sectional view taken along the line 11—11 of FIGURE 1.

The combined apparatus is assembled on a fixed base 10 on which is mounted a fixed weld clamp 11 and a longitudinally movable weld clamp 12, the latter being carried by plates 13 which are longitudinally slideable in guideways or bearings 14 carried by the base 10. Each of the clamps 11 and 12 has a vertically fixed lower platen 15 and a vertically movable upper platen 16. Each of the latter is carried by a crosshead 17 pivotally connected at either end to a vertically disposed pull rod 18. The latter, in turn, are pivotally connected at their lower ends to a lower crosshead 19 arranged to be raised and lowered by a centrally disposed air cylinder 20. It should be obvious that the arrangement results in uniform clamping pressure along the extent of the upper platen—i.e. throughout the transverse extent of the strip.

The base 10 carries a welding transformer 21, the secondary of which is connected through conductors 22 to the clamp platens 15 which, of course, are current-conductive. Also, the conductor 22 which is connected through the slideable clamp 12 is sufficiently flexible to permit free longitudinal movement of this clamp during flashing and upsetting.

Extending outwardly to one side of the base 10 and rigidly connected thereto is a large bracket 23 in which slides the carrier 24. The latter has upper and lower vertical guide rails 25 and 26, respectively, as well as a horizontally disposed guide rail 27. Engaging opposite faces of these rails are pre-loaded anti-friction rollers 28 whereby the carrier 24 is accurately guided for movement to the right and left as viewed in FIGURE 2. The carrier 24 has a horizontally disposed slot 29 extending inwardly from its forward or right end (as viewed in FIGURE 2), and pivotally mounted on this end are upper and lower cutting tools 30. These are so pivoted, as shown, so that they remain in precise vertical position as the carrier 24 moves forwardly to trim off the flash or upset but when the carrier moves in the opposite direction the tools can pivot away from its end to likely override a trimmed strip.

Rigidly mounted to the forward end portion of the carrier 24 is a forwardly and downwardly extending arm 31 which detachably carries at its forward or outer free end a combined gauge bar and die cleaner having an intermediate gauging web or plate 32 and thickened upper and lower die cleaning portions 33 and 34, respectively. In accordance with usual practice the weld clamp platens 15 and 16 are fitted with current-conductive die inserts as schematically shown at 35 in FIGURE 1. It is also known to be desirable to maintain the interfaces of these dies free of spelter and flash preparatory to making each weld so that the passage and distribution of the weld flash current through the adjacent ends of the workpieces is better controlled. By means of suitable adjustable stops, not shown, the double-acting upset cylinders 36 (one on either side of the machine) operate to separate the interfaces of the dies 35 a precise distance which is exactly equal to the thickness of the die cleaning bars or portions 33 and 34. It should therefore be apparent that with the dies thus properly separated, movement of the carrier 24 rearwardly or to the left, as viewed in FIGURE 2, will result in the cleaning off of the interfaces of the dies. Carrier 24 is moved in opposite directions by a double acting cylinder 37, and in actual practice the possible length of stroke of the carrier to the left is somewhat greater than what is apparent from the drawing.

It will be obvious that the vertical spacing of the die cleaning portions 33 and 34 will be exactly equal to the vertical spacing of the interfaces of the dies 35 when the clamps 11 and 12 are opened. The gauge plate 32 is at the elevation of the strip pass through the machine, and the operation of the apparatus is such that after the dies faces are cleaned by sliding movement of the carrier 24 to the left, as viewed in FIGURE 2, the cylinder 37 is re-energized in the opposite direction to now place the gauge plate 32 centrally between the two open clamps 11 and 12. The tail end of the leading strip length (indicated by reference numeral 38) is now brought into abutting relation with one face of the gauge bar 32 by manipulation of this length through pinch rolls or other moving means while the head end of the next succeeding strip length (indicated by reference numeral 39) is similarly brought into abutting relation with the other face of the gauge bar. The clamps 11 and 12 are now closed and the movable clamp 12 is backed off slightly by short-stroke cylinders 40 placed in the lines of drive between the cylinders 36 and the movable clamp 12. This permits the gauge bar 34 to be slid laterally out of the interstice between the adjacent ends of the strip lengths. The same is accomplished by further energization of the cylinder 37 to move the carrier 24 and the arm 31 into the relative position shown in FIGURE 2 of the drawing.

With the strip lengths loaded into the clamps 11 and 12, as explained, and the carrier 24 moved to the position shown in FIGURE 2, the flash-butt welding cycle may proceed immediately by energization of the transformer 21 and of the flashing and upset cylinders 36. By means of adjustable stop nuts on the rods of the cylinders 36, not shown but well understood in the art, the closing movement of clamp 12 toward fixed clamp 11 is precisely limited at the end of upset (end of weld cycle). Immediately upon the termination of this cycle and while the weld nugget as well as the extruded flash or upset and adjacent metal of the workpieces is still hot and while the workpieces remain rigidly secured by the clamps 11 and 12, the cylinder 37 is further energized to move the carrier 24 further to the right as viewed in FIGURE 2. This causes the precisely spaced and located cutting tools 30 to move laterally across the opposite surface of the welded strip in the region of the weld line to plane off excess flash and upset along the line of weld. Upon the tools 30 passing beyond the opposite edge of the strip, carrier 24 may be quickly retracted by proper energization of the cylinder 37 back to the position in which it is shown in FIGURE 2. At this time the clamps 11 and 12 are opened and the joined strip may readily begin to run through the apparatus and continue to do so until the next joint is required when another cycle of operation as above outlined may take place.

It should now be apparent that I have provided an improved strip joining apparatus which accomplishes the object initially set out above in that the apparatus required is of utmost simplicity and of increased ruggedness and is capable of performing its functions with a simplified sequence of operations. Obviously, in commercial embodiments automatic sequencing control circuits, not shown herein, will be employed to complete the total joining cycle in the least possible interval of time. Also, by reason of the rigid mounting of the arm 31 on the accurately guided carrier 24, it is possible to physically incorporate the die cleaners 33, 34 with the gauge bar 32, enabling the die cleaning to be effected by actuation of the cylinder 37. In actual practice, the assembly 32-34 is made readily detachable from the arm 31 to permit of the ready replacement of this unit to correct wear or to vary the spacing of the adjacent ends of the workpieces in the machine as is required for differences in gauge or characteristics of the workpieces. A quick-acting securing means shown schematically at 40a may be employed for this purpose.

Having thus described my invention what I claim is:

1. In metal strip joining apparatus of the kind having a pair of relatively movable current-conductive strip clamps for making a flash-butt welding therebetween as well as a trimming tool carrier slideable transversely of the longitudinal axis of the strip and mounting a pair of trimming tools for removing the excess flash and upset from opposite surfaces of the welded strip, the improvement comprising an arm rigidly secured to the forward portion of said carrier and overhanging the upper current-conductive strip clamp, said arm having a depending portion which carries a gauge bar in spaced relation to said tools by a distance greater than the width of the strip in a direction transverse of said axis whereby said tools and bar are normally disposed along opposite side edges of the strip, and means to slideably move said carrier tools and bar to first position said gauge bar centrally between said clamps to properly space strip lengths being loaded into said clamps, to thereafter position said tools and said bar on opposite sides of the strip, and to thereafter cause said tools to traverse the weld to remove excess flash and upset therefrom.

2. Apparatus according to claim 1 further including means carried by said carrier with said gauge bar and positioned along the upper and lower edge portions thereof to scrape the interfaces of the platens of said clamps to clean spelter therefrom upon sliding movement of said carrier and while said clamps are opened and prior to the positioning of said gauge bar centrally of said clamps to abuttingly receive the adjacent ends of strip lengths to be joined.

3. Apparatus according to claim 1 further characterized in that said gauge bar is detachably carried by said arm to permit replacement.

4. Apparatus according to claim 1 further characterized in that said carrier comprises a vertically extending slab-like member with vertically spaced flash-trimming tools pivotally mounted on the end thereof which is adjacent to said clamps, said member having a deep horizontal slot extending rearwardly from said end from a point between the adjacent cutting tips of said tools whereby said slot receives the strip as said tools move transversely to trim the weld.

5. Apparatus according to claim 4 further including two vertically spaced cutter bars carried above and below said gauge bar and operative to trim spelter off the interfaces of the platens of said clamps when said clamps are opened and prior to the positioning of said gauge bar centrally of said clamps to abuttingly receive the adjacent ends of strip lengths to be joined.

6. In metal strip joining apparatus having a pair of relatively movable current-conductive strip clamps for making a flash-butt weld therebetween, a support extending laterally of one of said clamps and being normally fixed with respect thereto, a carrier slideably mounted on said support for movement laterally of the longitudinal axis of the strip secured by said clamps, cylinder means for moving said carrier in opposite directions along its transverse path of travel, and flash-trimming means and an arm rigidly secured to the forward portion of said carrier and overhanging the upper current-conductive strip clamp, said arm having a depending portiton which carries a gauge bar in spaced relation to said ash-trimming means by a distance greater than the width of the strip in a direction transverse of said axis whereby said flash trimming means and bar are normally disposed along opposite side edges of the strip, said gauge bar and carrier being operative upon actuation of said cylinder means to position said gauge bar between said clamps to locate workpieces to be welded in said clamps and upon further actuation of said cylinder means and after welding to trim the flash from opposite surfaces of the strip.

7. Apparatus according to claim 6 further including die cleaning means carried with said gauge means whereby upon the opening of said clamps and before a welding cycle the interfaces of the platens of said clamps may be cleaned of spelter upon the initial actuation of said cylinder means.

References Cited

UNITED STATES PATENTS

| 2,203,151 | 6/1940 | Iverson | 219—101 |
| 3,278,719 | 10/1966 | Seeloff | 219—97 |
| 3,293,401 | 12/1966 | Williams et al. | 219—97 |

JOSEPH V. TRUHE, Primary Examiner

M. C. FLIESLER, Assistant Examiner

U.S. Cl. X.R.

219—101